United States Patent
Kalley et al.

(10) Patent No.: US 6,183,663 B1
(45) Date of Patent: Feb. 6, 2001

(54) LEAK DETECTION DYE DELIVERY SYSTEM

(75) Inventors: Terrence D. Kalley, Troy, MI (US); Richard C. Cavestri, Columbus, OH (US)

(73) Assignee: Bright Solutions, Inc., Troy, MI (US)

( * ) Notice: Under 35 U.S.C. 154(b), the term of this patent shall be extended for 0 days.

(21) Appl. No.: 09/169,197

(22) Filed: Oct. 9, 1998

(51) Int. Cl.[7] .................. G01M 3/20; G01M 3/04
(52) U.S. Cl. .................. 252/68; 252/964; 73/40.7
(58) Field of Search .................. 252/68, 964; 73/40.7

(56) References Cited

U.S. PATENT DOCUMENTS

| | | | |
|---|---|---|---|
| Re. 32,451 | 7/1987 | Proctor et al. | 62/149 |
| Re. 33,212 | 5/1990 | Lower | 62/126 |
| Re. 35,395 * | 12/1996 | Henry | 73/40.7 |
| 2,096,099 | 10/1937 | Gaugler | 73/40.7 |
| 2,994,295 | 8/1961 | Newcum | 116/117 |
| 3,118,463 | 1/1964 | Lacart | 137/343 |
| 3,785,164 | 1/1974 | Wrenn | 62/129 |
| 4,513,578 | 4/1985 | Proctor et al. | 62/149 |
| 4,688,388 | 8/1987 | Lower et al. | 62/126 |
| 4,745,772 | 5/1988 | Ferris | 62/292 |
| 4,758,366 * | 7/1988 | Parekh | 252/68 |
| 4,938,031 | 7/1990 | Manz et al. | 62/145 |
| 4,938,063 | 7/1990 | Leighley | 73/40.7 |
| 5,021,179 * | 6/1991 | Zehler et al. | 252/68 |
| 5,149,453 | 9/1992 | Parekh | 252/68 |
| 5,167,140 | 12/1992 | Cooper et al. | 73/40.7 |
| 5,272,882 | 12/1993 | Degier et al. | 62/77 |
| 5,349,998 | 9/1994 | Gonfiantini | 141/351 |
| 5,357,782 | 10/1994 | Henry | 73/40.7 |
| 5,574,213 | 11/1996 | Shanley | 73/40.7 |
| 5,826,636 | 10/1998 | Trigiani | 141/382 |
| 5,858,930 * | 1/1999 | Desai et al. | 508/261 |
| 5,918,269 * | 6/1999 | Mahaffey, Jr. | 73/40.7 |
| 5,975,151 | 11/1999 | Packo | 141/3 |

OTHER PUBLICATIONS

Davis, "Pinpointing Vehicle Leaks Faster with Ultraviolet Light", The American Society for Nondestructive Testing, Inc., Nov. 1989, vol. 47, No. 11, pp. 1248–1250.

Davis, "Pinpointing HFC–134a Leaks is easy if you use the proper equipment", Air Conditioning Heating & Refrigeration News, Dec. 7, 1992, pp. 36–41.

* cited by examiner

Primary Examiner—Christine Skane
(74) Attorney, Agent, or Firm—Fish & Richardson P.C.

(57) ABSTRACT

A leak detection dye delivery system for introducing a leak detection dye into a climate control system is described. The leak detection dye delivery system includes a canister loaded with a leak detection dye composition including dye concentrate, a lubricant, and a refrigerant.

33 Claims, 1 Drawing Sheet

LEAK DETECTION DYE DELIVERY SYSTEM

BACKGROUND OF THE INVENTION

The invention relates to a leak detection dye delivery system for introducing a leak detection dye composition into a climate control system.

Leak detection methods have been developed to analyze fluid systems, such as climate control systems, i.e., heating, cooling, ventilating, and air conditioning systems, using dyes. Some methods employ emissive substances, such as, for example, fluorescent or phosphorescent dyes that are added to the refrigerants and/or lubricants of a climate control system. Suitable leak detection dyes include naphthalimide, perylene, thioxanthane, coumarin, or fluorescein, and derivatives thereof.

Leaks can be detected by observing fluorescence of the dye at leak sites resulting from excitation of the dye with a light source having particular illumination characteristics. For example, suitable light sources for use in fluorescence detection transmit light of wavelengths suitable to excite the dye and cause light emission from the dye. In general, the dyes emit brightly when excited by light in the 190 to 700 nanometer wavelength range.

SUMMARY OF THE INVENTION

In general, the invention features a leak detection delivery system for introducing a leak detection dye into a climate control system. The leak detection dye delivery system includes a canister loaded with a dye concentrate, a lubricant, and a refrigerant.

In one aspect, the invention features a leak detection dye composition including a refrigerant, a lubricant, and a dye concentrate. The dye concentrate includes a fluorescent dye. The leak detection dye composition contains less than 50 percent by weight of the refrigerant.

The leak detection dye composition can include, for example, a first weight amount of the dye concentrate and a second weight amount of the refrigerant. The first weight amount can be greater than the second weight amount. In other embodiments, the leak detection dye composition can include, for example, a first weight amount of the dye concentrate, a second amount of the lubricant, and a third amount of the refrigerant. The first amount and the second amount, together, can be greater than the third amount.

The fluorescent dye is dissolved in the leak detection composition remains dissolved in the leak detection composition after 5 days at −10° C. Alternatively, the leak detection dye remains dissolved in the leak detection composition after 30 days at −10° C. The dye is dissolved and remains dissolved in the composition when the dye does not crystalize from the composition (i.e., the dye concentration remains below its solubility limit in the composition).

In another aspect, the invention features a leak detection dye delivery system including a canister containing a leak detection composition.

In another aspect, the invention features a method of manufacturing a leak detection dye delivery system. The method includes loading a canister with a lubricant, and a dye concentrate including a fluorescent dye. After loading, the canister includes a leak detection dye composition including a refrigerant, the dye concentrate, and the lubricant. The refrigerant can be introduced into the canister after loading the canister with the lubricant and the dye concentrate. The lubricant and the dye concentrate can be combined before loading the canister.

The canister can have a volume of less than about 5 ounces, preferably less than about 4 ounces, and more preferably less than about 3 ounces. For example, the canister volume can be between 2 and 2.5 ounces. The leak detection composition can contain less than 50 percent by weight of the refrigerant. The leak detection composition also can include a first weight amount of the dye concentrate and a second weight amount of the refrigerant, the first weight amount being greater than the second weight amount.

In yet another aspect, the invention features a method of introducing a leak detection dye into a climate control system including discharging into the climate control system a leak detection composition having a refrigerant, a lubricant, and a dye concentrate. The leak detection composition can be discharged from a canister into the climate control system. The climate control system can be an air conditioning system.

The refrigerant can include chlorofluorocarbons, hydrochlorofluorocarbons, hydrofluorocarbons, carbon dioxide, ammonia, halogenated or ether derivatives of methane or ethane, or halogenated ether or cyclic derivatives of propane, butane, pentane, or other hydrocarbons. The lubricant can include polyalkylene glycols, polyolesters, mineral oils, polyvinyl ethers, alkylbenzenes, or other synthetic lubricating materials.

The dye concentrate includes a leak detection dye such as a fluorescent dye. The fluorescent dye can include a naphthalimide, a perylene, a coumarin, a thioxanthane, a fluorescein, or a derivative thereof, or other dye compatible with climate control system. The fluorescent dye can be a liquid or a solid, such as a powder.

The leak detection dye delivery system is compact, making it easy to handle and use. The leak detection delivery system also can be used to deliver more consistent amounts of a leak detection dye into a climate control system. The delivery of dye can be more efficient as well. For example, the leak detection dye remains dissolved in the leak detection composition so that during shipping or storage the leak detection dye does not crystalize out of the composition, which can change the concentration of the leak detection dye which enters the system. By remaining dissolved, the leak detection dye does not form crystals while standing; the dye is completely soluble in the composition at a particular temperature for a particular amount of time. The small volume of the leak detection dye composition used in the leak detection dye delivery system reduces the amount of extraneous materials (e.g., dye, lubricant, and refrigerant) introduced into a climate control system.

The climate control system can be a mobile, stationary, window air conditioning system such as an automotive, portable, residential, or commercial air conditioning system, or any other hermetic system that employs a refrigerant and lubricant.

Additional features and advantages of the invention will become apparent from the detailed description of the preferred embodiments of the invention.

DESCRIPTION OF THE PREFERRED EMBODIMENTS

Figure 1:
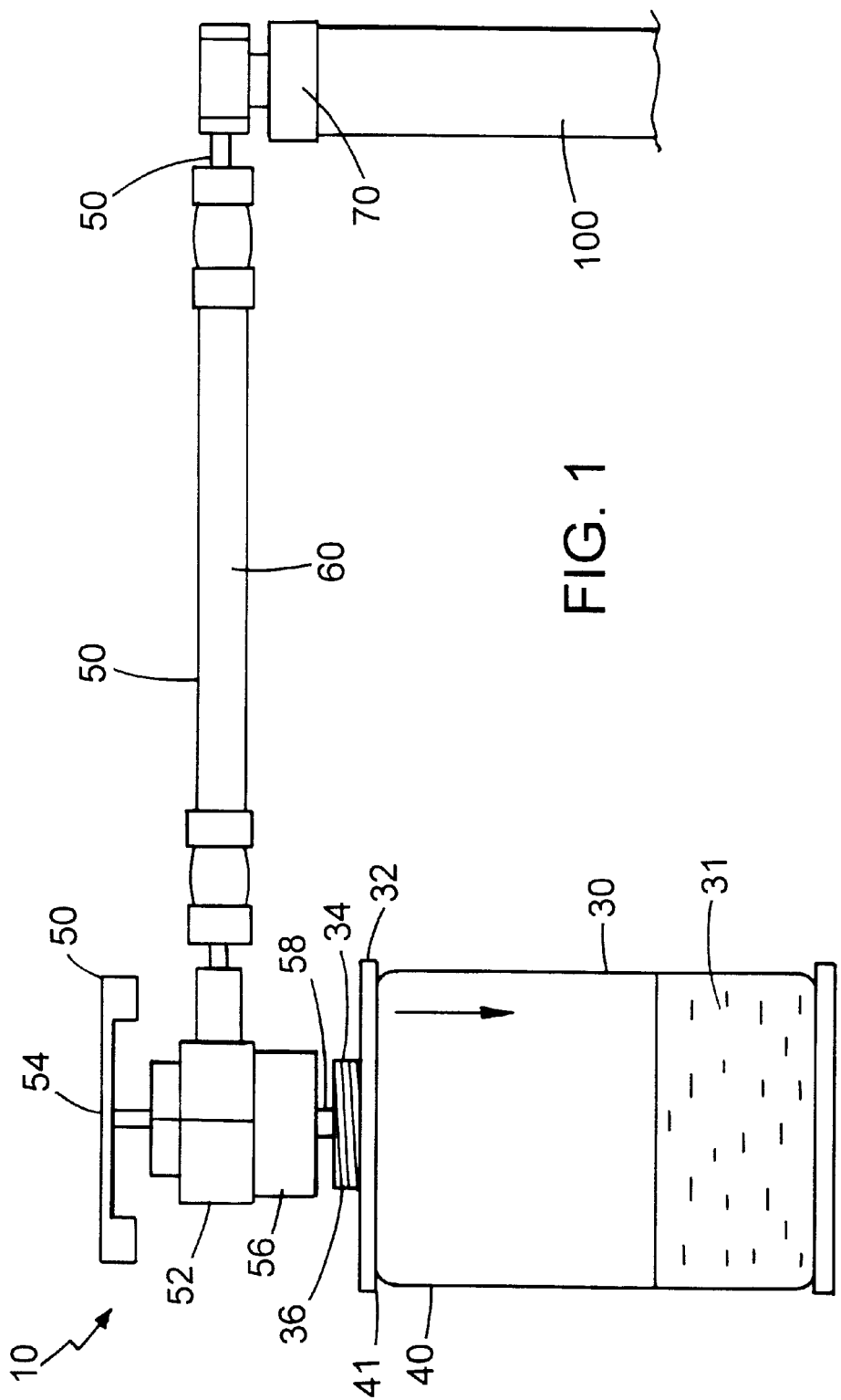
FIG. 1 is a schematic view of a leak detection system.

A leak detection dye delivery system includes a leak detection dye composition loaded into a canister. In general, the leak detection dye composition includes a dye concentrate, a lubricant, and a refrigerant.

The dye concentrate includes a fluorescent dye and a lubricant. The dye concentrate can consist essentially of the fluorescent dye and a lubricant or it can consist essentially of the fluorescent dye, a lubricant, and a solvent compatible with the climate control system. Alternatively, the leak detection composition can include only a fluorescent dye. The dye concentrate can be characterized as a liquid, solid, paste, or suspension. Suitable dye concentrates include, for example, STAY BRITE BSL 712, STAY BRITE BSL 714, (Bright Solutions, Troy, Mich.), each of which includes about 3% of a naphthalimide dye, DAY GLOW TRY-33 (Day Glow Color Corp., Cleveland, Ohio) which contains about 40% of a naphthalimide dye, or other dye concentrates which are described, for example, in U.S. Ser. No. 09/065,007, filed Apr. 23, 1998, which is incorporated herein by reference.

In general, the amounts of dye concentrate, refrigerant, and lubricant used to produce the leak detection dye composition can be adjusted so that the dye does not crystallize out of the composition. In particular, the amounts are adjusted so that crystallization of the dye does not occur when the leak detection composition is stored at −10° C. for 5 days. Compositions that exhibit crystallization under these conditions can lead to inaccurate delivery of leak detection dye into a climate control system. Whether a leak detection dye crystallizes out of the composition under these conditions, i.e., at −10° C. for 5 days, can depend on the amounts of dye concentrate, lubricant, and refrigerant, as well as on the different types of dye, dye concentrate, lubricant, and refrigerant. In addition, the amount of refrigerant included in the composition is sufficient to expel the dye concentrate and lubricant from the canister containing the composition.

The quality of the leak detection dye composition can be determined by storing the leak detection system at −10° C. for 5 days and then visually examining (e.g., with the unaided eye) the composition for formation of dye crystals. If crystallization of the leak detection dye is observed, a composition that does not crystalize at low temperatures (i.e., in which the dye remains dissolved) can be produced by varying the amounts of any or all of the composition components, e.g., the dye concentrate, the lubricant, and the refrigerant. The composition can be tested under the conditions described above and the process repeated until no visible leak detection dye crystallization occurs.

Typically, a leak detection dye composition includes less than 50 percent by weight of the refrigerant. In general, the weight percentage of the dye concentrate combined with the lubricant is usually greater than the weight percentage of the refrigerant in the composition. For example, a leak detection dye composition including a naphthalimide dye, e.g., Solvent Yellow 43 (Keystone Aniline Corporation, Chicago, Ill.), a polyol ester lubricant, e.g., Emery 2928 (Henkel Emery Group, Cincinnati, Ohio), and a hydrofluorocarbon refrigerant, e.g., 1,1,1,2-tetrafluoroethane (R-134a, Allied Signal, Morristown, N.J.), when stored at −10° C. for 5 days, does not show visible signs of leak detection dye crystallization so long as the weight percentage of the dye concentrate combined with the lubricant is greater than the weight percentage of the refrigerant. Additionally, the weight percentage of the dye concentrate can be greater than the weight percentage of the refrigerant.

Several techniques are available for preparing the leak detection dye composition. Generally, the dye concentrate is combined with the lubricant to form a mixture. The mixture can be stirred (e.g., mechanically) to dissolve the dye concentrate in the lubricant. Once mixed, the mixture is loaded into a canister. The canister is then charged with refrigerant to form the leak detection dye composition. The refrigerant can be charged into the canister by injecting it through an aerosol valve on the can or by an under the cap filler, which involves introducing the refrigerant at the shoulder between the canister edge and the cap and crimping the cap to the canister after the introduction. Once charged with refrigerant, the composition can be shaken to complete mixing.

Typically, the canister can have a total volume less than about 5 ounces. For example, the canister can have a volume of 2 to 3 ounces. Suitable material for canisters include stainless steel, aluminum, or plastics. The canister also can include an outlet, i.e., a valve or a septum. The canister includes a can portion that provides a bottom and side walls to the canister, and a cap portion that provides a top to the canister. The cap portion is sealed to the can portion and crimped closed to form the container. Suitable can portions can be obtained from Sexton Canisters of Decatur, Ala., for example, part number 106X300. Suitable cap portions can be obtained, for example, from Cap & Seal Co., Elgin, Ill. The cap portion can have an aerosol valve that can be actuated or a seal that can be punctured to release the composition from the canister.

A suitable lubricant can include a polyalkylene glycol, a polyolester, a mineral oil, a polyvinyl ether, an alkylbenzene, or other synthetic lubricating material. Suitable polyalkylene glycol or polyol ester lubricants include, for example, Emery 2928, Emery 2927a, Mobil Arctic EAL 68, Union Carbide UCON 488, Union Carbide UCON MLX-1197, Union Carbide 50-HB5100, Motorcraft YN-12B, ICI RL-32H, Ford PAG, Chrysler PAG, or any other automotive PAG.

Referring to FIG. 1, leak detection delivery system 10 includes canister 30 and injector 50. Canister 30 is formed from can portion 40 and cap portion 32. Can portion 40 and cap portion 32 can be crimped to form a seal at canister edge 41. Canister 30 contains leak detection dye composition 31. Cap portion 32 includes threaded closure 34. Injector 50 is used to transfer leak detection dye composition 31 into climate control system 100. For example, transfer port 70 (e.g., a quick coupler connector) can be attached to a low pressure side of an air conditioning system. Injector 50 includes valve assembly 52, transfer hose 60, and transfer port 70. Valve assembly 52 of injector 50 includes a handle 54 connected to a needle 58, and nut 56 having internal threads (not shown).

Valve assembly 52 of injector 50 can be assembled onto threaded closure 34 of canister 30 via threaded nut 56. A suitable cap portion 32, for example, is available from Cap & Seal Company, Elgin, Ill., for example, part number B250. Threaded closure 34 can include a seal (not shown) or a valve (not shown), such as a spring loaded aerosol valve. As handle 54 is turned, needle 58 extends downwardly (see arrow) towards the canister and punctures a seal (not shown) or actuates the valve of threaded closure 34, thereby releasing leak detection dye composition 31 through valve assembly 52, transfer tube 60, and transfer port 70 into climate control system 100.

After loading the leak detection dye composition into a climate control system, the system is operated to circulate the refrigerant, the lubricant, and the dye concentrate. The circulating refrigerant and lubricant disperse the leak detection dye throughout the system. Typically, the dye content of the system can be below about 0.1 percent. After the dye has been allowed to circulate within the system, system components, joints, or attachments can be examined with a light source having a light emission wavelength from 190 nanometers to 700 nanometers. The presence of a leak can be determined by the presence of a colored visual indication, such as fluorescence or other light emission, that can be detected after excitation with the light from the light source.

The following examples are illustrative, but do not limit the invention.

EXAMPLES

Example 1

The solubility of a naphthalimide dye, e.g., Solvent Yellow 43, in various compositions of a dye concentrate, STAY BRITE BSL 712, a lubricant, Emery 2928, and a refrigerant, R-134a (1,1,1,2-tetrafluoroethane), was tested at different temperatures and storage durations. The compositions and results of the solubility tests are detailed in Table 1. About 2 to 2.5 milliliters of each leak detection dye composition were loaded into a glass tube which was then sealed. At room temperature, each composition was clear, indicating that the dye was soluble. Tubes were placed either into a 5° C. refrigerator or a −10° C. freezer for five or thirty days. The samples were then removed and visually inspected for formation of crystals or a flocculent precipitate.

The compositions containing a weight percentage of the dye concentrate combined with the lubricant greater than the weight percentage of refrigerant did not form crystals over five days at −10° C. Thus, these compositions are particularly useful in leak detection dye delivery systems because leak detection dye composition will not be adversely affected by cold shipping or storage conditions.

In addition to the examples presented in Table 1, several leak detection dye compositions, prepared with lubricant ICI RL-32H, were tested by the protocol described above. The results of these tests are consistent with the data presented in Table 1 above. For example, when stored in −10° C. conditions for 5 days, no leak detection dye crystals were visually observed in compositions in which a weight percentage of the dye concentrate combined with the lubricant was greater than the weight percentage of refrigerant.

TABLE 1

| Composition | Parts By Weight ||| Observations ||||
| | Dye | EMERY 2928 | R-134a | 20° C. for 5 days | 5° C. for 5 days | −10° C. for 5 days | −10° C. for 30 days |
| --- | --- | --- | --- | --- | --- | --- | --- |
| 1A | 2 | 1 | 1 | Clear | Clear | Clear | Clear |
| 1B | 2 | 1 | 2 | Clear | Clear | Clear | Clear |
| 1C | 2 | 1 | 4 | Clear | Crystals | Crystals | Crystals |
| 1D | 2 | 1 | 6 | Crystals | Crystals | Crystals | Crystals |
| 1E | 1 | 1 | 1 | Clear | Clear | Clear | Clear |
| 1F | 1 | 1 | 2 | Clear | Clear | Clear | Clear |
| 1G | 1 | 1 | 3 | Crystals | Crystals | Crystals | Crystals |
| 1H | 1 | 1 | 4 | Crystals | Crystals | Crystals | Crystals |
| 1I | 1 | 1 | 6 | Crystals | Crystals | Crystals | Crystals |
| 1J | 1 | 2 | 1 | Clear | Clear | Clear | Clear |
| 1K | 1 | 2 | 2 | Clear | Clear | Clear | Clear |
| 1L | 1 | 2 | 3 | Clear | Clear | Crystals | Crystals |
| 1M | 1 | 2 | 4 | Clear | Crystals | Crystals | Crystals |
| 1N | 1 | 4 | 1 | Clear | Clear | Clear | Clear |
| 1O | 1 | 4 | 4 | Clear | Clear | Clear | Clear |
| 1P | 1 | 4 | 6 | Clear | Clear | Crystals | Crystals |
| 1Q | 1 | 6 | 6 | Clear | Clear | Clear | Clear |

Example 2

As an example of the consistent and efficient high yield delivery of the leak detection dye from the delivery system, the percent recovery of dye concentrate and lubricant was calculated for four leak detection dye compositions, labeled Examples 2 A–D. For each experiment, 0.25 to 0.50 ounces of each leak detection composition was loaded into stainless steel 2.5 ounce container, i.e., a ¾' diameter tube equipped with a Whitey-type discharge valve. Once loaded, the composition was discharged into a vessel. The contents of the vessel were weighed and the percent recovery of dye concentrate and lubricant was calculated.

The results of the expelled recovery are presented in Table 2. High percentages of recovery were obtained for the compositions.

TABLE 2

| Composition | Dye Concentrate | Lubricant | Refrigerant R-134a | Recovery of Dye Concentrate and Lubricant | Percent Recovery |
| --- | --- | --- | --- | --- | --- |
| | STAY BRITE BSL 712 | EMERY 2928 | | | |
| 2A | 7.0 grams | 14.0 grams | 7.0 grams | 13.5 grams | 95.7% |
| 2B | 7.0 grams | 14.0 grams | 14.0 grams | 20.5 grams | 97.6% |
| | STAY BRITE BSL 714 | ICI RL32H | | | |
| 2C | 7.0 grams | 7.0 grams | 7.0 grams | 13.5 grams | 97.1% |
| 2D | 7.0 grams | 14.1 grams | 14.0 grams | 21.0 grams | 99.5% |

Other embodiments are within the claims.
What is claimed is:
1. A leak detection dye composition comprising:
    a refrigerant including 1,1,1,2-tetrafluoroethane, a lubricant including a polyol ester, and a dye concentrate comprising a fluorescent naphthalimide dye;

wherein the leak detection dye composition contains less than 50 percent by weight of the refrigerant.

2. The leak detection dye composition of claim 1, wherein the composition includes a first weight amount of the dye concentrate and a second weight amount of the refrigerant, the first weight amount being greater than the second weight amount.

3. The leak detection dye composition of claim 1, wherein the composition includes a first weight amount of the dye concentrate, a second amount of the lubricant, and a third amount of the refrigerant, the first amount and the second amount, together, being greater than the third amount.

4. The leak detection dye composition of claim 1, wherein the fluorescent dye is dissolved in the leak detection composition and remains dissolved in the leak detection composition after 5 days at −10° C.

5. The leak detection dye composition of claim 1, wherein the fluorescent dye is dissolved in the leak detection composition and remains dissolved in the leak detection composition after 30 days at—10° C.

6. The leak detection dye composition of claim 1, wherein the composition consists essentially of 1,1,1,2-tetrafluoroethane, a polyol ester, and a naphthalimide dye.

7. A leak detection dye delivery system comprising:
a canister containing a leak detection composition including a refrigerant including 1,1,1,2-tetrafluoroethane, a lubricant including a polyol esters and a dye concentrate comprising a fluorescent naphthalimide dye,
wherein the leak detection dye composition contains less than 50 percent by weight of the refrigerant.

8. The leak detection dye delivery system of claim 7, wherein the fluorescent dye is dissolved in the leak detection composition and remains dissolved in the leak detection composition after 5 days at −10° C.

9. The leak detection dye delivery system of claim 7, wherein the canister has a volume of less than 5 ounces.

10. The leak detection dye delivery system of claim 7, wherein the composition includes a first weight amount of the dye concentrate, a second weight amount of the lubricant, and a third amount of the refrigerant, the first amount and the second amount, together, being greater than the third amount.

11. The leak detection dye delivery system of claim 7, wherein the fluorescent dye is dissolved in the leak detection composition and remains dissolved in the leak detection composition after 30 days at −10° C.

12. The leak detection dye delivery system of claim 7, wherein the canister has a volume of less than 3 ounces.

13. The leak detection dye delivery system of claim 9, wherein the canister includes an aerosol valve.

14. The leak detection dye delivery system of claim 13, further comprising an injector including a valve assembly, a transfer port, and a transfer hose, the valve assembly being capable of opening the aerosol valve.

15. A method of manufacturing a leak detection dye delivery system comprising:
loading a canister with a lubricant including a polyol ester, and a dye concentrate comprising a fluorescent naphthalimide dye, and
charging the canister with a refrigerant including 1,1,1,2-tetrafluoroethane,
wherein after loading, the canister includes a leak detection dye composition containing less than 50 percent be weight of the refrigerant.

16. The method of claim 15, wherein the canister has a volume of less than 5 ounces.

17. The method of claim 15, wherein the leak detection composition includes a first weight amount of the dye concentrate and a second weight amount of the refrigerant, the first weight amount being greater than the second weight amount.

18. The method of claim 15, wherein the composition includes a first weight amount of the dye concentrate, a second weight amount of the lubricant, and a third amount of the refrigerant, the first amount and the second amount, together, being greater than the third amount.

19. The method of claim 15, wherein the fluorescent dye is dissolved in the leak detection composition and remains dissolved in the leak detection composition after 5 days at −10° C.

20. The method of claim 15, wherein the canister has a volume of less than 3 ounces.

21. The method of claim 15, wherein the canister is charged with the refrigerant after loading the canister with the lubricant and the dye concentrate.

22. A method of introducing a leak detection system into a climate control system comprising:
discharging into the climate control system a leak detection composition including a refrigerant including 1,1,1,2-tetrafluoroethane, a lubricant including a polyol ester, and a dye concentrate comprising a fluorescent naphthalimide dye, the leak detection composition containing less than 50 percent by weight of the refrigerant.

23. The method of claim 22, wherein the leak detection composition is discharged from a canister into the climate control system.

24. The method of claim 23, wherein the canister has a volume of less than 5 ounces.

25. The method of claim 22, wherein the climate control system is an air conditioning system.

26. The method of claim 22, wherein the composition includes a first weight amount of the dye concentrate, a second weight amount of the lubricant, and a third amount of the refrigerant, the first amount and the second amount, together, being greater than the third amount.

27. The method of claim 22, wherein the fluorescent dye is dissolved in the leak detection composition and remains dissolved in the leak detection composition after 5 days at −10° C.

28. The method of claim 22, wherein the fluorescent dye is dissolved in the leak detection composition and remains dissolved in the leak detection composition after 30 days at −10° C.

29. The method of claim 23, wherein the canister has a volume of less than 3 ounces.

30. The method of claim 23, further comprising assembling the canister and a valve assembly of an injector, the injector including the valve assembly, a transfer hose, and a transfer port, attaching the transfer port to a service valve of the climate control system, and releasing the leak detection composition from the canister.

31. A leak detection dye delivery system comprising:
a canister having a volume of less than 5 ounces, the canister containing a first weight amount of a dye concentrate including a fluorescent naphthalimide dye, a second weight amount of a lubricant including a polyol ester, and a third amount of a refrigerant including 1,1,1,2-tetrafluoroethane, the first amount and the second amount, together, being greater than the third amount.

32. The leak detection dye delivery system of claim 31, wherein the fluorescent dye is dissolved in the leak detection composition and remains dissolved in the leak detection composition after 5 days at −10° C.

33. The leak detection dye delivery system of claim 31, wherein the canister has a volume of less than 3 ounces.

* * * * *